(12) United States Patent
Nashio et al.

(10) Patent No.: US 10,730,354 B2
(45) Date of Patent: Aug. 4, 2020

(54) PNEUMATIC TIRE

(71) Applicant: TOYO TIRE & RUBBER CO., LTD., Osaka-shi, Osaka (JP)

(72) Inventors: Hiroshi Nashio, Osaka (JP); Takeshi Miyamoto, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 103 days.

(21) Appl. No.: 15/421,545

(22) Filed: Feb. 1, 2017

(65) Prior Publication Data

US 2017/0232803 A1 Aug. 17, 2017

(30) Foreign Application Priority Data

Feb. 15, 2016 (JP) ................................ 2016-026213

(51) Int. Cl.
*B60C 13/02* (2006.01)
*B60C 17/00* (2006.01)

(52) U.S. Cl.
CPC .......... *B60C 13/02* (2013.01); *B60C 17/0009* (2013.01)

(58) Field of Classification Search
CPC ..... B60C 13/00; B60C 13/001; B60C 13/002; B60C 13/003; B60C 13/02; B60C 13/023
See application file for complete search history.

(56) References Cited

U.S. PATENT DOCUMENTS

| | | | | |
|---|---|---|---|---|
| 8,434,534 | B2* | 5/2013 | Barton | B60C 11/01 152/209.16 |
| 8,739,849 | B2* | 6/2014 | Kuroishi | B60C 13/02 152/153 |
| 2009/0032161 | A1 | 2/2009 | Yamaguchi | |
| 2010/0038001 | A1 | 2/2010 | Yamaguchi | |
| 2010/0180994 | A1* | 7/2010 | Yamaguchi | B60C 11/01 152/153 |
| 2010/0294412 | A1* | 11/2010 | Inoue | B60C 13/02 152/523 |
| 2012/0085473 | A1 | 4/2012 | Matsuo et al. | |
| 2013/0075006 | A1 | 3/2013 | Kojima et al. | |
| 2013/0220498 | A1* | 8/2013 | Kawakami | B60C 11/01 152/209.1 |
| 2015/0165831 | A1* | 6/2015 | Kodama | B60C 11/01 152/523 |

FOREIGN PATENT DOCUMENTS

| | | |
|---|---|---|
| CN | 102448739 A | 5/2012 |
| CN | 103072435 A | 5/2013 |

(Continued)

OTHER PUBLICATIONS

Machine translation of JP 2013-71637, 2013.*

(Continued)

*Primary Examiner* — Justin R Fischer
(74) *Attorney, Agent, or Firm* — Westerman, Hattori, Daniels & Adrian, LLP

(57) ABSTRACT

A pneumatic tire includes a projection formed on a surface of a tire tread portion. A thickness of the projection, which is a distance from the surface of the tread portion to a top surface of the projection, is smaller than a width of the projection, which is a size of the top surface in a tire circumferential direction. The width of the projection is equal to or more than 10 mm.

14 Claims, 16 Drawing Sheets

(56) References Cited

FOREIGN PATENT DOCUMENTS

| | | | |
|---|---|---|---|
| JP | 2008-279900 A | | 11/2008 |
| JP | 2008-302740 A | | 12/2008 |
| JP | 2009-96447 | * | 5/2009 |
| JP | 2009-160992 | * | 7/2009 |
| JP | 2009-279954 | * | 12/2009 |
| JP | 2010-168001 A | | 8/2010 |
| JP | 2013-071634 A | | 4/2013 |
| JP | 2013-71637 | * | 4/2013 |
| WO | 2007/032405 A1 | | 3/2007 |
| WO | 2008/114668 A1 | | 9/2008 |

OTHER PUBLICATIONS

Machine translation of JP 2009-279954, 2009.*
Machine translation of JP 2009-160992, 2009.*
Machine translation of JP 2009-96447, 2009.*
Office Action dated Jul. 26, 2018, issued in counterpart Chinese application No. 201710062179.7, with English translation. (11 pages).
Office Action dated Feb. 22, 2019, issued in counterpart CN application No. 201710062179.7, with English translation. (10 pages).
Office Action dated May 19, 2020, issued in counterpart JP Application No. 2016-026213, with English translation (10 pages).

* cited by examiner

US 10,730,354 B2

PNEUMATIC TIRE

CROSS-REFERENCE TO RELATED APPLICATIONS

This application claims priority of Japanese Patent Application No.: 2016-026213 filed on Feb. 15, 2016, the content of which is incorporated herein by reference.

BACKGROUND OF THE INVENTION

Technical Field

The present invention is related to a pneumatic tire.

Related Art

International Publication WO 2007/032405 and International Publication WO 2008/114668 disclose a run flat tire where a plurality of projections is formed on tire side portions for air cooling. These projections intend to create turbulence in an air flow on surfaces of the tire side portions along with the rotation of the tire. Due to the creation of turbulence, a velocity gradient of an air flow in the vicinity of the surface of the tire side portion is increased and, hence, a heat radiation property of the tire is enhanced.

SUMMARY

Neither International Publication WO 2007/032405 nor International Publication WO 2008/114668 discloses the enhancement of a heat radiation property by techniques other than the creation of turbulence in an air flow in the vicinity of a surface of the tire side portion.

It is an object of the present invention to effectively promote heat radiation of a pneumatic tire by air cooling, and thereby enhancing durability of the pneumatic tire.

Inventors of the present invention have made extensive studies on optimization (or maximization) of a velocity gradient of an air flow in a vicinity of a surface of a tire side portion. It has been known that when an object (for example, a flat plate) is disposed in a flow of a fluid, a speed of the fluid is rapidly lowered in the vicinity of a surface of the object due to viscosity of the fluid. Outside a region where the speed of the fluid rapidly changes (a boundary layer), a region where the speed of the fluid is not influenced by viscosity is formed. A thickness of the boundary layer is increased toward a downstream side from a front edge of the object. Although the boundary layer in the vicinity of the front edge of the object is a laminar flow (a laminar-flow boundary layer), the laminar-flow boundary layer is turned into a turbulent flow (a turbulent flow boundary layer) as the laminar-flow boundary layer flows toward a downstream side through a transitional region. Inventors of the present invention have found out that a velocity gradient of the fluid is large in the laminar-flow boundary layer so that heat radiation efficiency from the object to the fluid is high, and have completed the present invention based on such finding. That is, the inventors of the present invention have come up with an idea of applying a high heat radiation property in the laminar-flow boundary layer to air cooling of the pneumatic tire. The present invention has been made based on such a novel idea.

An aspect of the present invention provides a pneumatic tire, comprising a projection formed on a surface of a tire side portion, wherein a thickness of the projection, which is a distance from the surface of the tire side portion to a top surface of the projection is smaller than a width of the projection, which is a size of the top surface in a tire circumferential direction, and wherein the width of the projection is equal to or more than 10 mm.

The projection has a shape where the thickness is smaller than the width, and an air flow in the vicinity of the tope surface of the projection forms a laminar flow. An air flow made of a laminar flow (a laminar-flow boundary) has a large velocity gradient and, hence, heat radiation due to air cooling of the top surface of the projection can be effectively promoted. Further, because the width of the projection is set to equal to or more than 10 mm, an enough heat radiation area by the formation of the laminar flow can be ensured.

According to the pneumatic tire of the present invention, when the pneumatic tire is rotated, the air flow which flows on the top surface becomes the laminar flow and, hence, heat radiation of the pneumatic tire by air cooling is effectively promoted whereby durability of the pneumatic tire is enhanced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

First Embodiment

Figure 1:
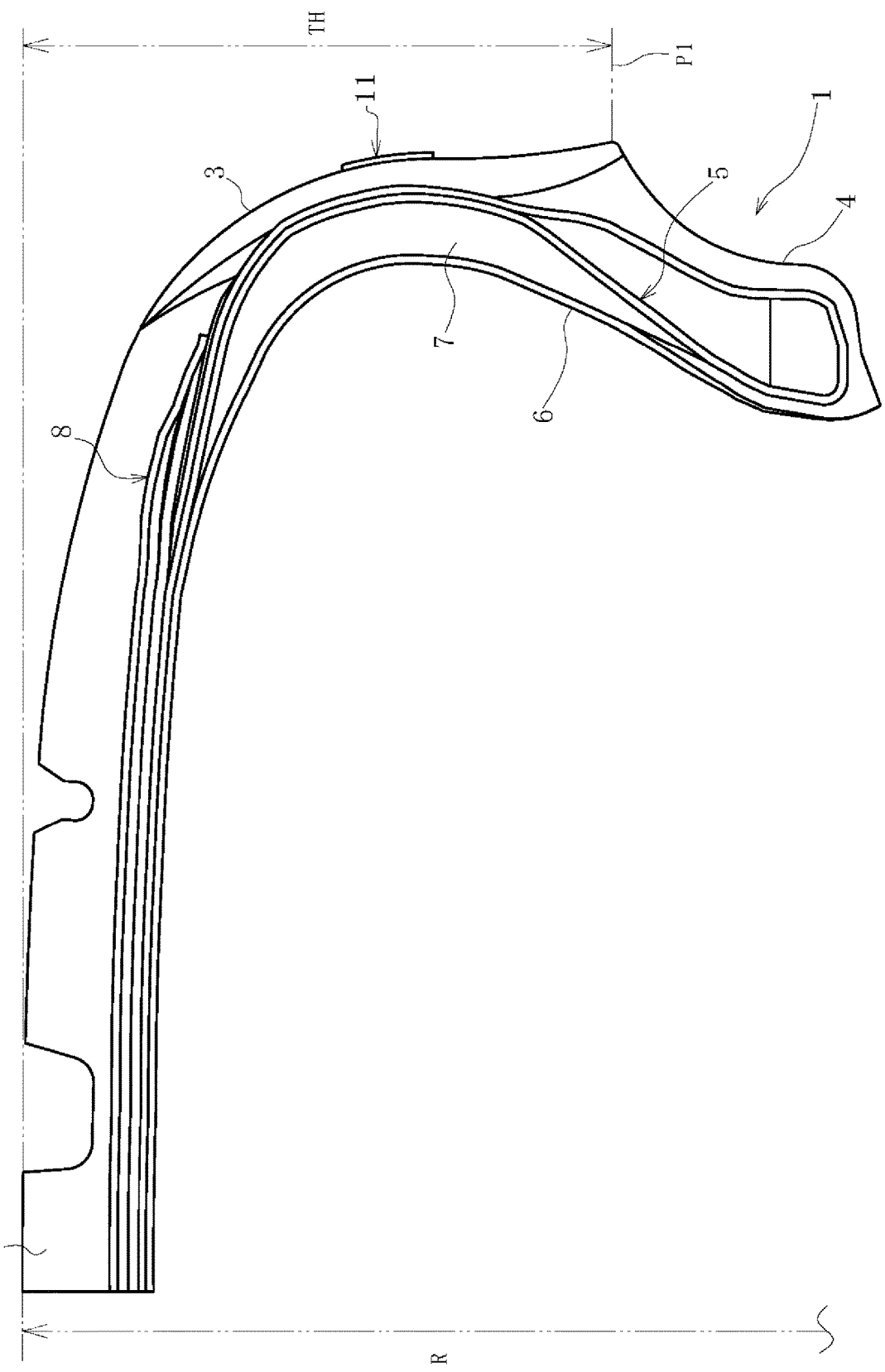
FIG. 1 is a meridian cross-sectional view of a pneumatic tire according to a first embodiment of the present invention.

FIG. 1 shows a rubber-made pneumatic tire (hereinafter referred to as a tire) 1 according to a first embodiment of the present invention. The tire 1 of this embodiment is a run-flat tire having a size of 245/40R18. The present invention is also applicable to tires having different sizes. The present invention is also applicable to tires not belonging to the category of run-flat tires. A rotational direction of the tire 1 is designated. The designated rotational direction is indicated by an arrow RD shown in FIG. 3.

The tire 1 includes a tread portion 2, a pair of tire side portions 3, and a pair of bead portions 4. Each bead portion 4 is disposed on an inner end portion of the tire side portion 3 in a tire radial direction (an end portion on a side opposite to the tread portion 2). A carcass 5 is disposed between the pair of bead portions 4. A reinforcing rubber 7 is disposed between the carcass 5 and an inner liner 6 on an innermost peripheral surface of the tire 1. A belt layer 8 is disposed between the carcass 5 and a tread surface of the tread portion 2. In other words, in the tread portion 2, the belt layer 8 is disposed outside the carcass 5 in a tire radial direction.

Figure 2:
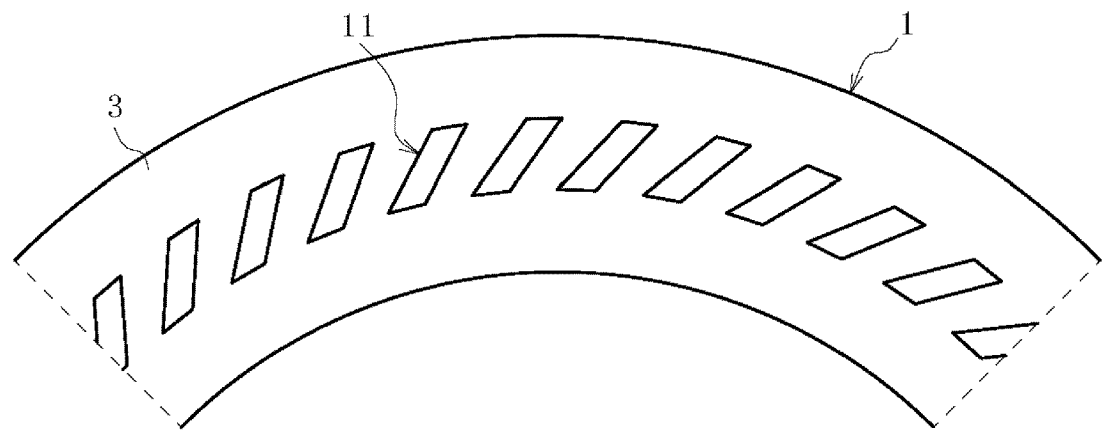
FIG. 2 is a partial side view of the pneumatic tire according to the first embodiment of the present invention.
Figure 3:
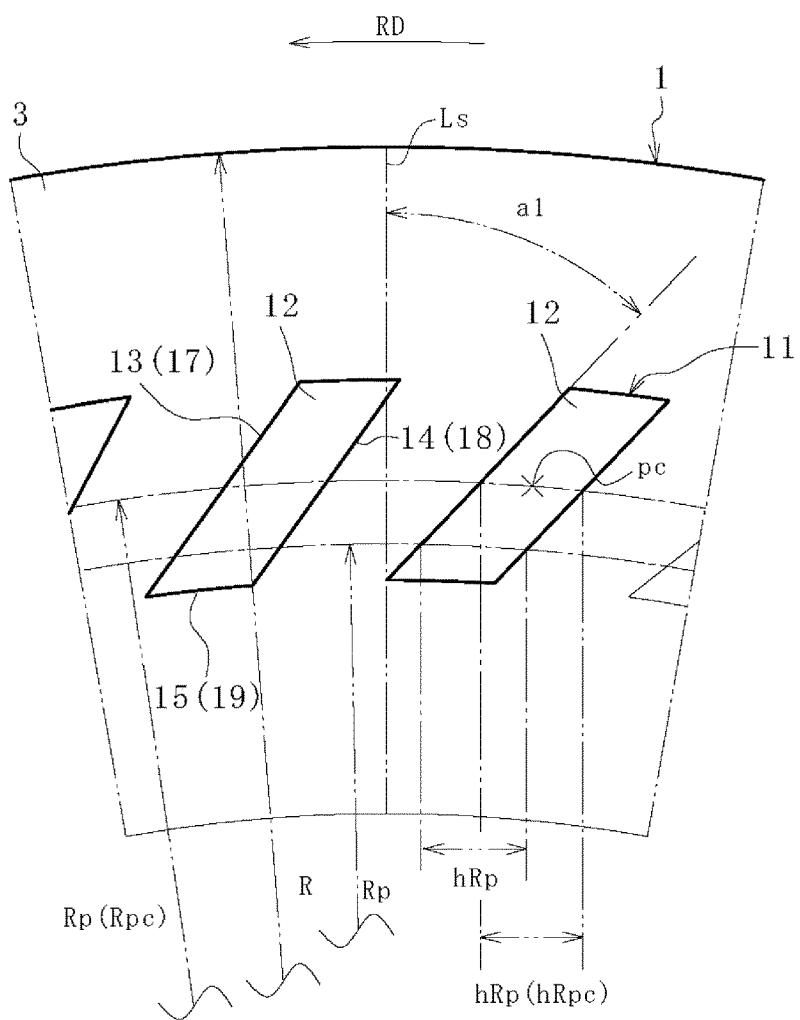
FIG. 3 is a partially enlarged view of the pneumatic tire shown in FIG. 2.

With reference to FIGS. 2 and 3, a plurality of projections 11 is disposed on a surface of the tire side portion 3 at intervals in a tire circumferential direction. In this embodiment, these projections 11 have the same shape, the same size, and the same posture. In FIG. 1, a distance from an outermost peripheral position P1 of a rim (not shown in the drawing) to an outermost position of the tread portion 2 in a tire radial direction (tire height) is indicated by a symbol TH. The projection 11 can be disposed within a range of from 0.05 times to 0.7 times inclusive of the tire height TH from the outermost peripheral position P1 of the rim.

In this specification, a term of "plan view" or terms similar there to may be used with respect to the shape of the projection 11 as viewed in a tire width direction. Further, a term of "end surface view" or terms similar thereto may be used with respect to the shape of the projection 11 as viewed from an inner end surface 15 side described later.

Figure 4:
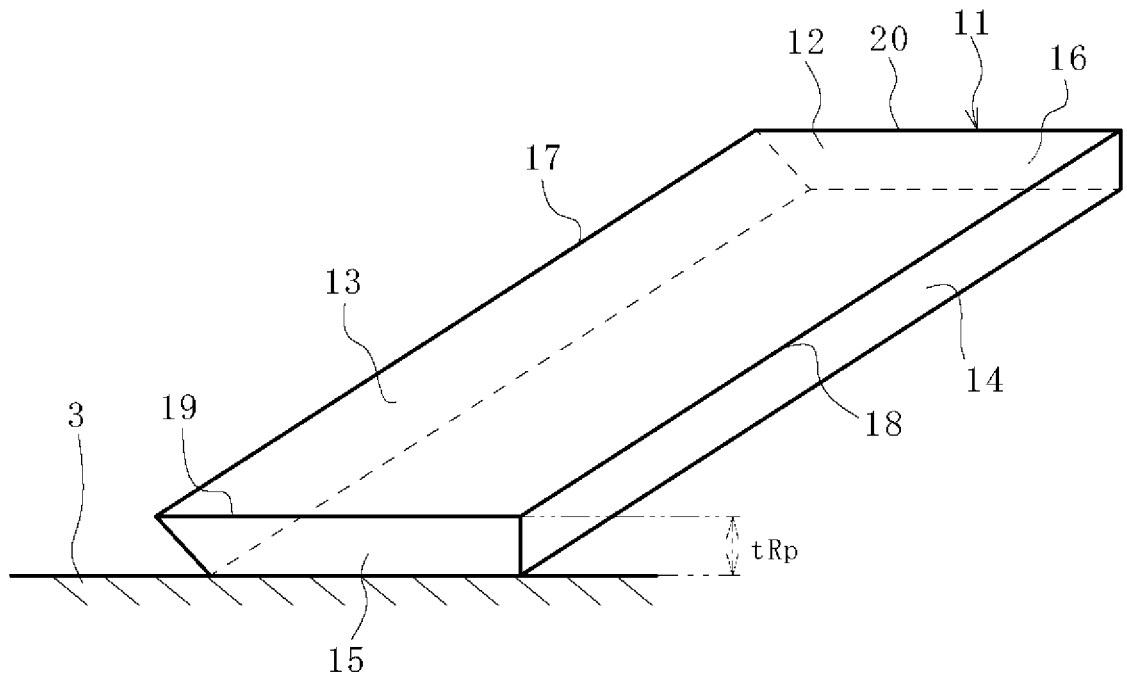
FIG. 4 is a perspective view schematically showing a projection.
Figure 5:
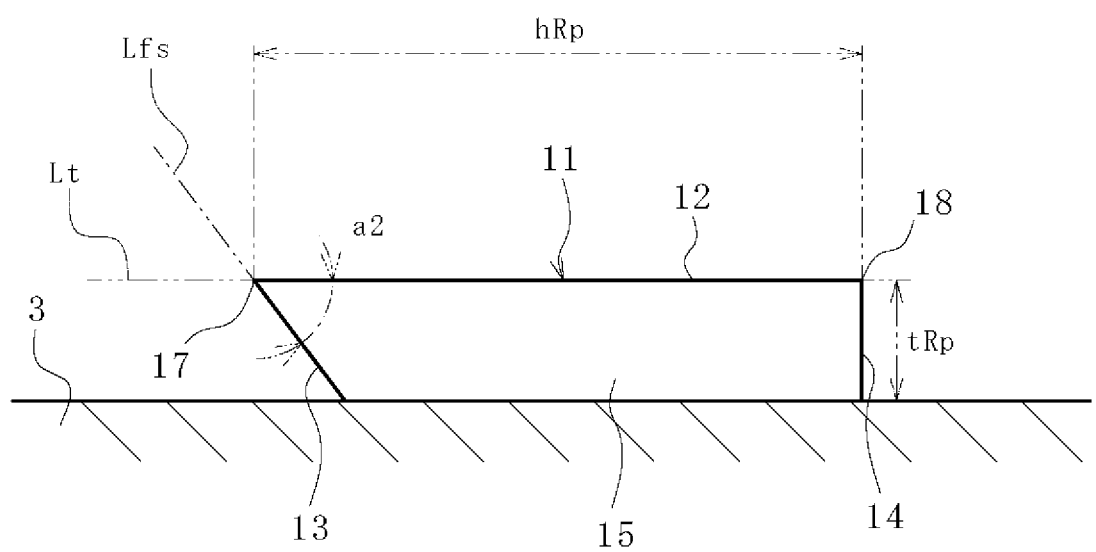
FIG. 5 is an end surface view of the projection.

With reference to FIGS. 4 and 5, in this embodiment, the projection 11 includes a top surface 12 which is a flat surface expanding along a surface of the tire side portion 3. The projection 11 also includes a pair of side surfaces disposed opposite to each other in the tire circumferential direction, that is, a front side surface 13 and rear side surface 14. The front side surface 13 is positioned on a front side in the tire rotational direction RD, and the rear side surface 14 is positioned on a rear side in the tire rotational direction RD. The projection 11 also has a pair of end surfaces disposed opposite to each other in the tire radial direction, that is, an inner end surface 15 disposed inside in the tire radial direction, and an outer end surface 16 disposed outside in the tire radial direction. As described later in detail, the front side surface 13 in this embodiment is a flat surface which is inclined with respect to a surface of the tire side portion 3 and the top surface 12. In this embodiment, the rear side surface 14, the inner end surface 15, and the outer end surface 16 are flat surfaces extending substantially perpendicular to the surface of the tire side portion 3.

A front side edge portion 17 is a portion where the top surface 12 and the front side surface 13 intersect with each other. A rear side edge portion 18 is a portion where the top surface 12 and the rear side surface 14 intersect with each other. An inner side edge portion 19 is a portion where the top surface 12 and the inner end surface 15 intersect with each other. An outer side edge portion 20 is a portion where the top surface 12 and the outer end surface 16 intersect with each other. As in the case of this embodiment, the front side edge portion 17, the rear side edge portion 18, the inner side edge portion 19, and the outer side edge portion 20 may be formed of an acute or clear edge. However, these side edge portions may have a shape that is curved to some extent as viewed in an end surface view. In this embodiment, all of the front side edge portion 17, the rest side edge portion 18, the inner side edge portion 19, and the outer side edge portion 20 have a linear shape as viewed in a plan view. However, these side edge portions may have a curved shape such as an arcuate shape or an elliptical shape as viewed in a plan view. Further, these side edge portions may have a shape formed of a bent line consisting of a plurality of straight lines or may have a shape formed of a combination of one or more straight lines and one for more curved lines.

With reference to FIG. 3, the front side edge portion 17 is inclined with respect to a straight line which passes the front side edge portion 17 and extends in the tire radial direction as viewed in a plan view. In other words, the front side edge portion 17 is inclined with respect to the tire radial direction. An inclination angel a1 of the front side edge portion 17 with respect to the tire radial direction is defined as an angle (a clockwise direction being a positive direction as viewed in a plan view) made by a reference straight line Ls, which passes the front side edge portion 17 at the most forward position in the tire circumferential direction of the front side edge portion 17 and extends in the tire radial direction, and the direction along which the front side edge portion 17 extends (in this embodiment, the front side edge portion 17 per se which is a straight line).

Figure 12:
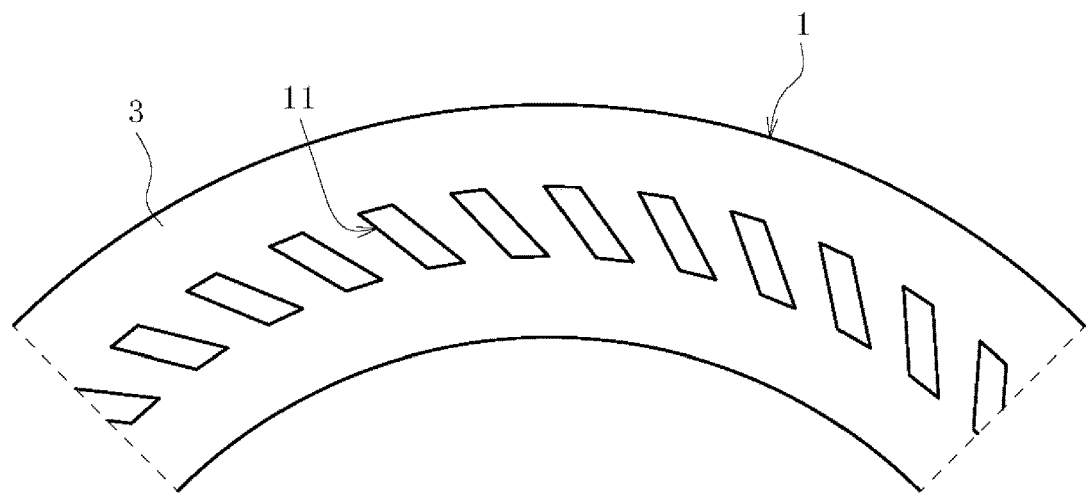
FIG. 12 is a partial side view of a pneumatic tire including projections each having inclination angles of side portions different from inclination angles of side edge portions according to the first embodiment.
Figure 13:
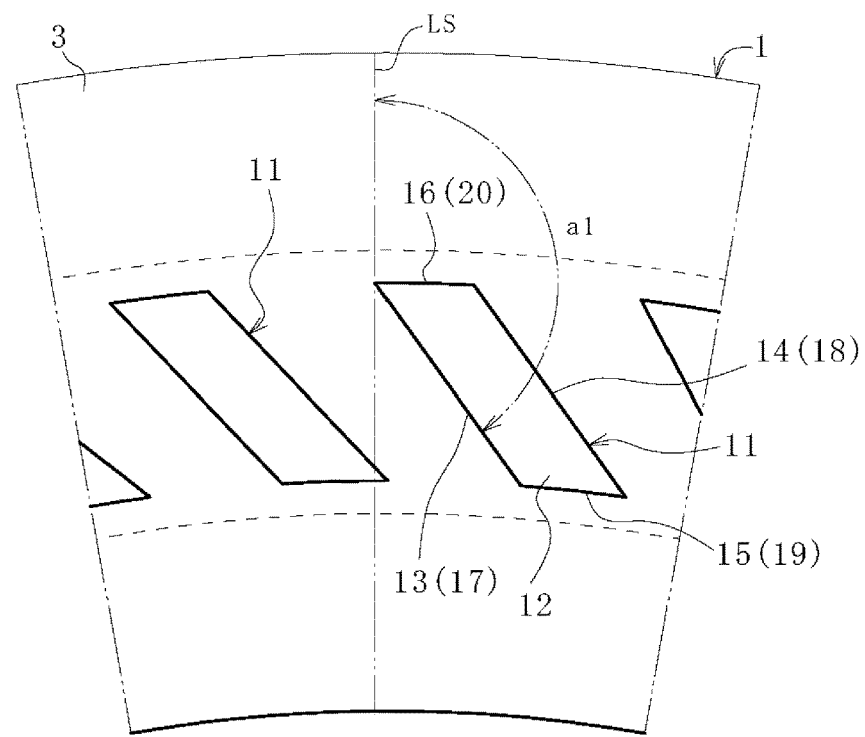
FIG. 13 is a partially-enlarged view of FIG. 12.

The front side edge portion 17 in this embodiment extends rightward and upward as viewed in a plan view. As shown in FIGS. 12 and 13, the front side edge portion 17 of the projection 11 may have a configuration to as to extend rightward and downward as viewed in a plan view. The rear side edge portion 18 in this embodiment extends substantially parallel to the front side edge portion 17 as viewed in a plan view. In this embodiment, the inner side edge portion 19 and the outer side edge portion 20 extend substantially parallel to each other as viewed in a plan view.

With reference to FIG. 3, symbol R indicates a tire radius, and symbol Rp indicates a distance from the center of rotation of the tire to an arbitrary position of the projection 11 in the tire radial direction. Symbol Rpc in FIG. 3 indicates a distance from the center of rotation of the tire to the center pc of the projection 11 (for example, a centroid the top surface 12 as viewed in a plan view). Symbol hRp in FIG. 3 indicates a size of the projection 11 in the tire circumferential direction, that is, a width of the projection 11 at an arbitrary position in the tire radial direction. Symbol hPc in FIG. 3 indicates a width of the projection 11 at the center pc.

Also with reference to FIG. 5, in this embodiment, a thickness tRp of the projection 11 at an arbitrary position of the projection 11 in the tire radial direction is fixed. That is, the projection 11 has the uniform thickness tRp in the tire radial direction. In this embodiment, the thickness tRp of the projection 11 is also fixed from the front side surface 13 (front side edge portion 17) to the rear side surface 14 (rear side edge portion 18). That is, the projection 11 has the uniform thickness tRp also in the tire circumferential direction.

Figure 6:
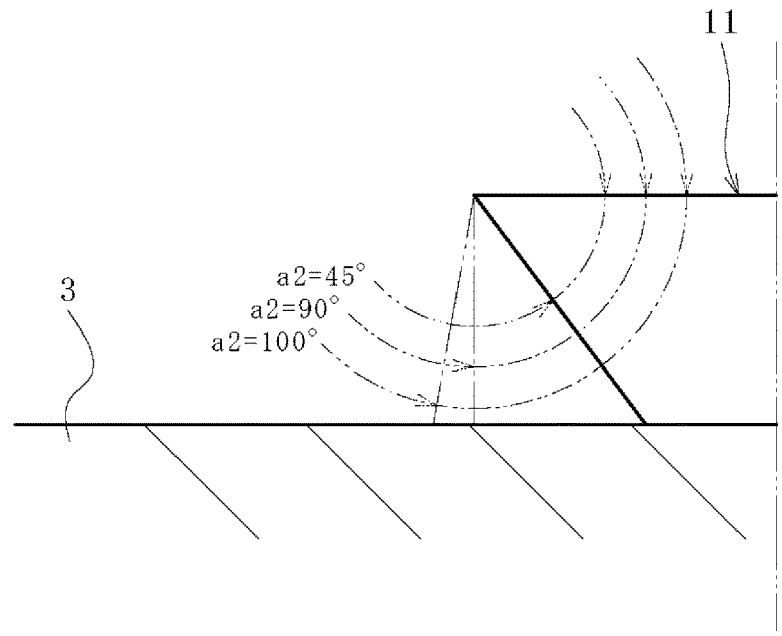
FIG. 6 is a partial end surface view of the projection for describing an angle of a tip end.

With reference to FIGS. 5 and 6, as viewed in an end surface view, the top surface 12 and the front side surface 13 of the projection 11 make a certain angle (tip end angle a2) on the front side edge portion 17. In this embodiment, the front side surface 13 has an inclination such that a distance between the top surface 12 and the front side surface 13 of the projection 11 is gradually narrowed toward a front side edge portion 17 so as to have a tapered shape. In other words, the inclination of the front side surface 13 is set such that the lower end of the front side surface 13 is positioned rearward with respect to the front side edge portion 17 in the tire rotational direction RD. This setting of the inclination of the front side surface 13 results in that the tip end angle a2 of the projection 11 in this embodiment is accurate angle (45°). The definition of the tip end angles a2 will be specifically described later.

Figure 7:
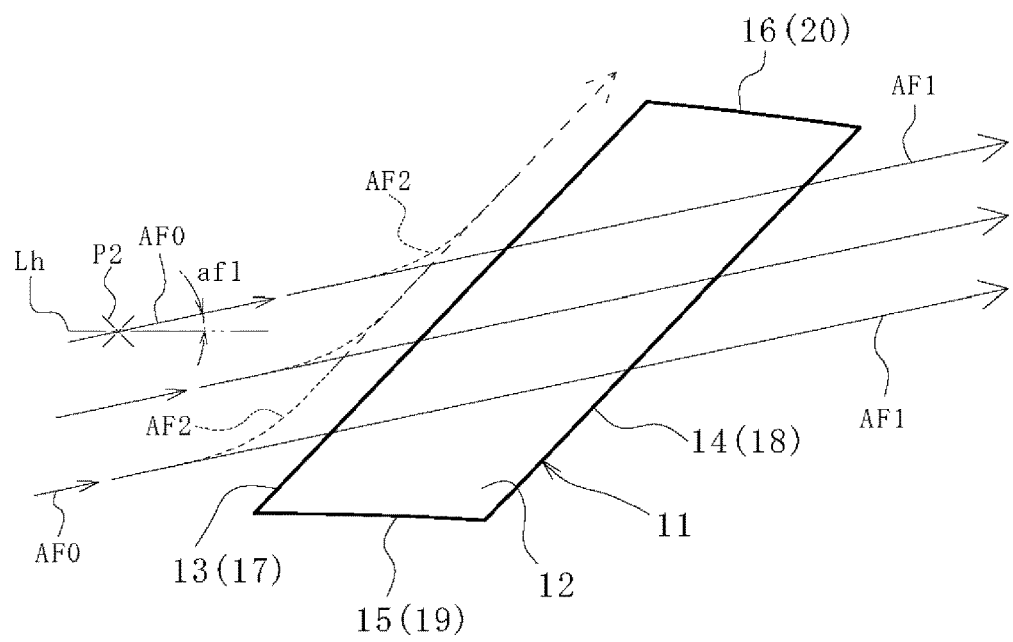
FIG. 7 is a plan view of the projection for explaining an air flow path.
Figure 8:
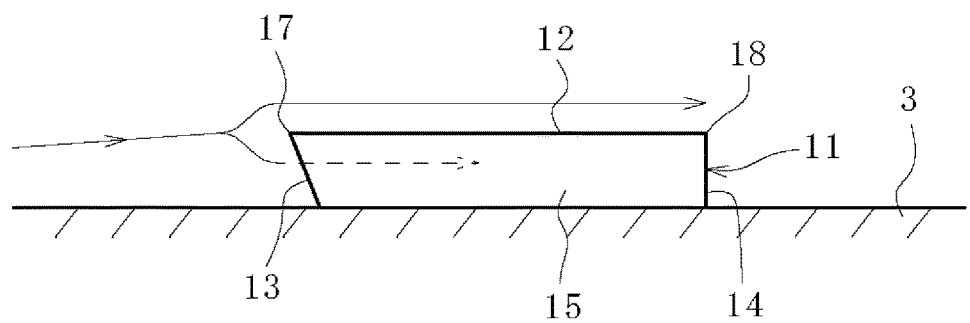
FIG. 8 is an end surface view of the projection for explaining an air flow path.
Figure 9:
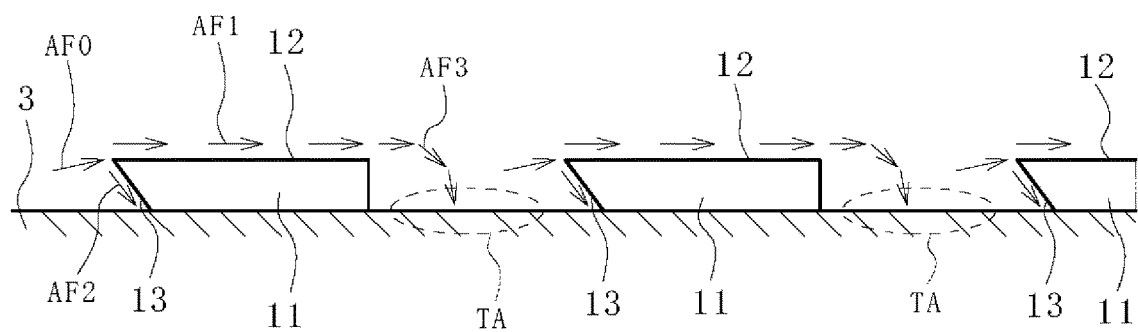
FIG. 9 is a schematic view for describing the projections and an air flow path between the projections.

With reference to FIGS. 7 to 9, when a vehicle with the tire 1 travels, as conceptually indicated by an arrow AF0 in FIG. 7A, an air flow which flows to the projection 11 from a front side edge portion 17 side is generated in the vicinity of the surface of the tire side portion 3. Further, with reference FIG. 7, the air flow AF0 at a specific position P2 on the surface of the tire side portion 3 has an angle (flow-in angle afl) with respect to a perpendicular (horizontal line Lh) drawn from a straight line which passes the position P2 and extends in the tire radial direction. According to a result obtained from an analysis made by the inventors of the present invention, on conditions that a tire size is 245/40R18, a distance Rpc from the center of rotation of the tire to the center Pc of the projection 11 is 550 mm, and a traveling speed of the vehicle is 80 km/h, the flow-in angle afl is 12°. When the traveling speed changes within a range of from 40 to 120 km/h, the flow-in angle afl changes by an approximately ±1°. In an actual use of the tire, the tire is influenced by various factors including a head wind, a structure of the vehicle and the like in addition to a traveling speed and, hence, it is regarded that the flow-in angle afl under the previously-mentioned conditions takes a value which falls within a range of approximately 12±10°.

Further with reference to FIGS. 7 to 9, an air flow AF0 flows to the projection 11 from the front side edge portion 17 and is divided into two air flows at the time of flowing into the projection 11. As most clearly shown in FIG. 7, one air flow AF1 gets over the top surface 12 from the front side surface 13 and flows toward the rear side edge portion 18 from the front side edge portion 17 along the top surface 12 (main air flow). The other air flow AF2 flows toward the outside in the tire radial direction along the front side surface 13 (sub air flow). As shown in FIGS. 12 and 13, when the front side edge portion 17 is formed to be extending rightward and downward as viewed in plan view, the air flow AF2 flows toward the inside in the tire radial direction along the front side surface 13.

Figure 10:
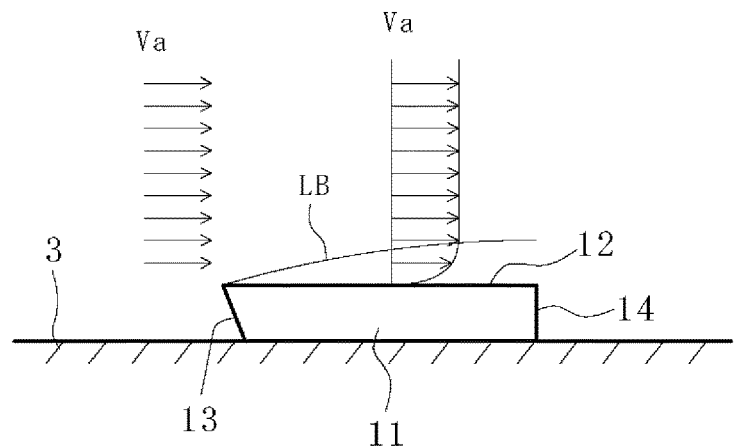
FIG. 10 is an end surface view of the projection for explaining a boundary layer.

Also with reference to FIG. 10, the air flow AF1 which flows along the top surface 12 of the projection 11 forms a laminar flow. That is, a laminar-flow boundary layer LB is formed in the vicinity of the top surface 12 of the projection 11. In FIG. 10, symbol Va conceptually indicates a velocity gradient of the air flows AF0, AF1 in the vicinity of the surface of the tire side portion 3 and in the vicinity of the top surface 12 of the projection 11. Since the air flow AF1 which is a laminar flow has a large velocity gradient, heat is radiated from the top surface 12 of the projection 11 to the air flow AF1 with high efficiency. In other words, the air flow AF1 on the top surface 12 of the projection 11 forms a laminar flow and, hence, heat radiation by air cooling can be effectively promoted. Due to such effective air cooling, durability of the tire 1 is enhanced.

As indicated by an arrow AF3 in FIG. 9, an air flow which passes along the top surface 12 and flows toward a downstream side from the rear side edge portion 18 falls toward the surface of the tire side portion 3 from the top surface 12. The air flow AF3 impinges on the surface of the tire side portion 3. As a result, an air flow in a region TA in the vicinity of the surface of the tire side portion 3 is turned into a turbulent flow between the projections 11, 11 disposed adjacently to each other. In this region TA, due to the increase of a velocity gradient brought about by the formation of the turbulent flow in the air flow, the heat radiation from the surface of the tire side portion 3 is promoted.

As has been described heretofore, in the tire 1 of this embodiment, due to both the formation of a laminar flow in the air flow AF1 on the top surface 12 of the projection 11 and the formation of a turbulent flow in the air flow AF3 between the projections 11, 11, a heat radiation property of the tire 1 is enhanced.

Figure 11:
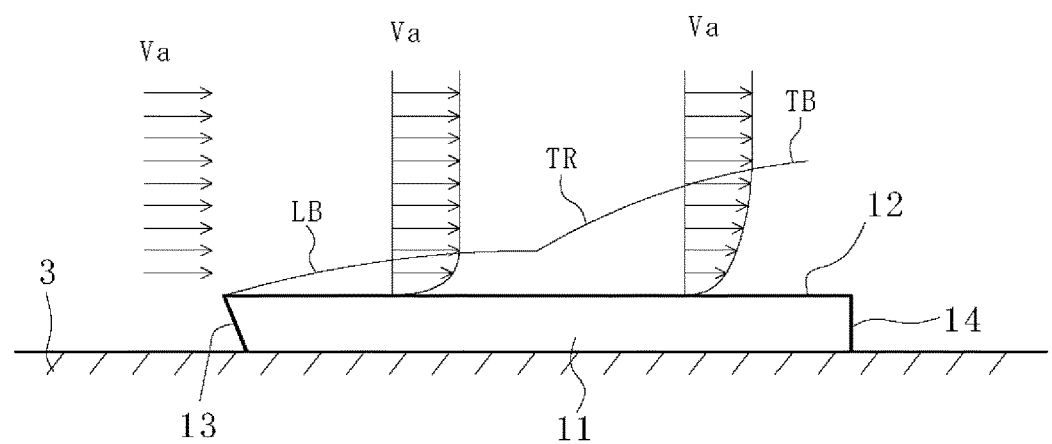
FIG. 11 is an end surface view of the projection for explaining the boundary layer.

As described in detail later, it is desirable that the width hRp of the projection 11 at a position located at a distance Rp from the center of rotation of the tire (see FIG. 3) be set such that a laminar flow boundary layer LB is formed to the rear side edge portion 18 of the top surface 12 of the projection 11. However, as conceptually shown in FIG. 11, the width hRp of the projection 11 is allowed to have a relatively long size where a velocity boundary layer forms a transitional region TR or a turbulent flow boundary layer TB on the rear side edge portion 18 side of the top surface 12 of the projection 11. Also in this case, in a region of the top surface 12 of the projection 11 where the laminar flow boundary layer LB is formed, the tire 1 can acquire an advantageous effect that a heat radiation property can be enhanced due to a large velocity gradient.

To divide the air flow AF0 into the air flows AF1, AF2 when the air flow AF0 flows to the projection 11 as described above, it is preferable that the thickness tRp of the projection 11, particularly, the thickness tRp of the projection 11 at portions corresponding to the front side edge portion 17 be set smaller than the width hp of the projection 11 (or a minimum width when the width hp is not fixed).

As described previously, the air flow AF0 which flows to the projection 11 has a flow-in angle afl. To divide the air flow AF0 into the air flows AF1, AF2, it is necessary to set the inclination angle a1 of the left side edge portion 17 as viewed in a plan view such that an entry angle of the air flow AF0 with respect to the front side edge portion 17 18 does not become 90°. In other words, as viewed in a plan view, it is necessary to incline the front side edge portion 17 of the projection 11 with respect to the air flow AF0.

With reference to FIG. 3, as in the case of this embodiment, when the front side edge portion 17 is inclined rightward and upward as viewed in a plan view, it is preferable to set the front side edge portion 17 such that the front side edge portion 17 intersects with the air flow AF0 which flows to the front side edge portion 17 at an angle of 45°. In this case, as described previously, an entry angle afl of the air flow AF0 is regarded as approximately 12±10° and, hence, it is preferable that the inclination angle a1 of the front side edge portion 17 be set to a value which falls within a range defined by the following formula (1).

$$23° \leq a1 \leq 43° \tag{1}$$

With reference to FIG. 13, when the front side edge portion 17 is inclined rightward and downward, it is preferable that the inclination angle a1 of the front side edge portion 17 be set such that the front side edge portion 17 intersects with the air flow AF0 which flows into the front side edge portion 17 at an angle of 45°. That is, it is preferable that the inclination angle a1 be set to a value which falls within a range defined by the following formula (2).

$$113° \leq a1 \leq 133° \tag{2}$$

In short, it is preferable that the inclination angle of the front side edge portion 17 be set to satisfy the formulation (1) or (2).

With reference to FIGS. 5 and 6, to divide the air flow AF0 into the air flows AF1, AF2 when the air flow AF0 flows into the projection 11, it is necessary to prevent tip end angles a2 of the projection 11 from being set to excessively large values. To be more specific, it is preferable that the tip end angles a2 be set to 100° or less. It is more preferable that the tip end angles a2 be set to acute angles, that is, angles which are not more than 90°. It is not preferable that the tip end angles a2 be set to excessively small values because such setting of the tip end angles a2 causes lowering of strength of the projection 11 in the vicinity of the front side edge portion 17. Accordingly, it is preferable that the tip end angles a2 be set to a value which falls particularly within a range of from 45° to 65° inclusive.

With reference to FIG. 3, when the width hRp of the projection 11 at an arbitrary position in the tire radial direction is excessively narrow, an area of heat radiation from the projection 11 by the laminar flow boundary layer LB in the vicinity of the top surface 12 becomes insufficient and, hence, a sufficient heat radiation promoting effect by the laminar flow cannot be acquired. Accordingly, it is preferable that the width hRp of the projection 11 be set to 10 mm or more.

Further with reference to FIG. 3, it is preferable that the width hRp of the projection 11 at an arbitrary position in the tire radial direction be set such that the width hRp satisfies the following formula (3). In all formulae described hereinafter, an SI unit system is used.

$$10 \leq hRp \times \left(\frac{Rp}{R}\right) \leq 50 \tag{3}$$

R: tire radius

Rp: distance from the center of rotation of tire to arbitrary position on projection hRp: width of projection at position away from the center of rotation of tire by distance Rp When the width hRp is excessively small, a region where the velocity gradient is increased cannot be sufficiently ensured so that a sufficient cooling effect cannot be acquired. A lower limit value "10" in the formula (3) corresponds to a minimum required heat radiation area for ensuring a heat radiation promoting effect by the laminar flow.

When the width hRp is excessively large, the velocity boundary layer grows excessively on the projection 11 so that a velocity gradient becomes small thus deteriorating a heat radiation property of the tire 1. An upper limit value "50" in the formula (3) is defined from such a viewpoint. Hereinafter, the reason why the upper limit value is set to 50 is described.

It has been known that the growth of a velocity boundary layer on a flat plate, that is, the transition from the laminar flow boundary layer LB to the turbulent flow boundary layer TB is expressed by the following formula (4).

$$x \cong 3 \times 10^5 \frac{v}{U} \tag{4}$$

x: distance from tip end of flat plate at which transition from laminar flow boundary layer to turbulent flow boundary layer occurs U: flow-in velocity v: kinematic velocity coefficient of fluid To take into account the influence of turbulence in a main flow and the lowering of a velocity gradient due to the growth of a boundary layer to some extent in the vicinity of the transition region, it is considered that a maximum value hRp_max of the width hRp of the projection 11 necessary for acquiring a sufficient cooling effect is approximately ½ of the distance x in the formula (4). Accordingly, the maximum width hRp_max of the projection 11 is expressed by the following formula (5).

$$hRp\_max \cong 1.5 \times 10^5 \frac{v}{U} \tag{5}$$

A flow-in speed U of a fluid to the projection 11 is expressed as a product of a distance Rp from the center of rotation of the tire to an arbitrary position of the projection 11 in the tire radial direction and a tire angular velocity (U=Rpω). A vehicle speed V is expressed as a product of a tire radius R and the tire angular velocity (V=Rω). Accordingly, the relationship expressed by the following formula (6) is established.

$$U = \frac{Rp}{R} V \tag{6}$$

With respect to a kinematic viscosity coefficient v of air, the following formula (7) is established.

$$v \approx 1.5 \times 10^{-5} \quad (7)$$

The following formula (8) is obtained by incorporating the formulae (6), (7) into the formula (5).

$$hRp\_max \cdot \frac{Rp}{R} \cong \frac{2.25}{V} \quad (8)$$

Assuming a vehicle speed V as 80 km/h, hRp_max is expressed by the formula (8).

$$hRp\_max \cdot \frac{Rp}{R} \cong 100 \text{ (mm)}$$

To take into account a condition of traveling at a high speed where heat generation of the tire 1 becomes more outstanding, to be more specific, to take into account a vehicle speed V up to 160 km/h, hRp_max is expressed by the formula (8).

$$hRp\_max \cdot \frac{Rp}{R} \cong 50 \text{ (mm)}$$

In this manner, to form the laminar flow boundary layer LB over the entire top surface 12 of the projection 11 in the width direction even during a state of traveling at a high speed (vehicle speed V: 160 km/h or below), an upper limit value of the formula (3) becomes 50.

FIGS. 12 to 15D show various alternatives of the shape of the projection 11 as viewed in a plan view.

The projection 11 shown in FIGS. 12 and 13 has, as described previously, the front side edge portion 17 extending rightward and downward as viewed in a plan view.

Figure 14A:
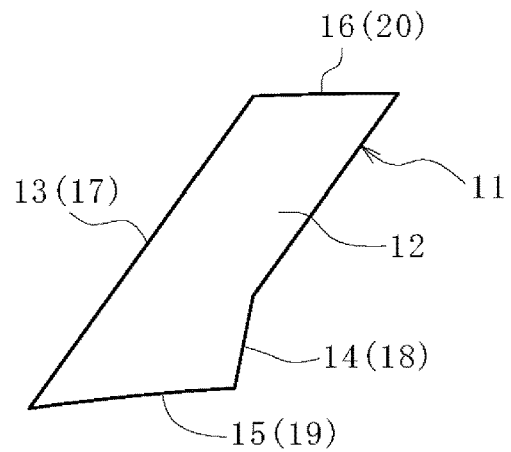
FIG. 14A is a view showing an alternative of a shape of the projection as viewed in a plan view.

The rear side edge portion 18 of the projection 11 shown in FIG. 14A has a shape as viewed in a plan view consisting of two straight lines with the inclination angles different with each other.

Figure 14B:
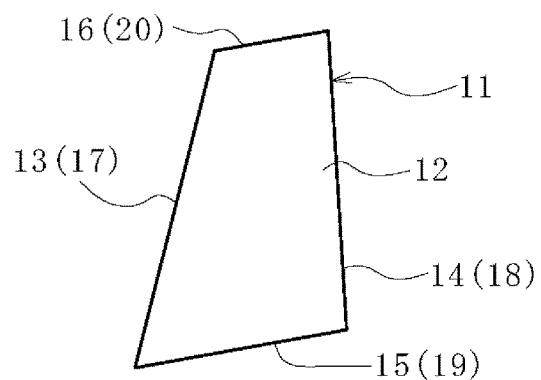
FIG. 14B is a view showing another alternative of the shape of the projection as viewed in the plan view.
Figure 14C:
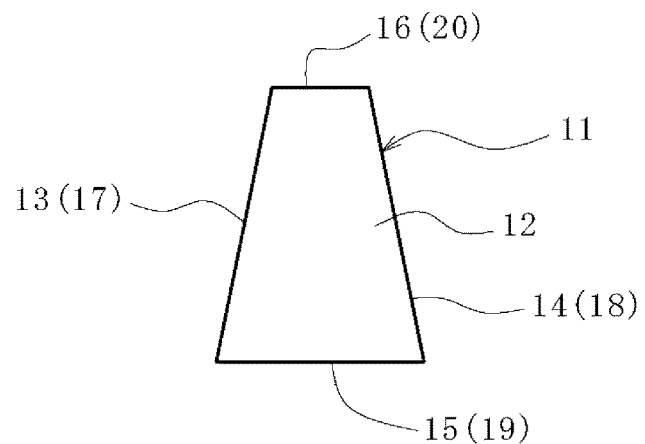
FIG. 14C is a view showing still another alternative of the shape of the projection as viewed in the plan view.

Each of the projections 11 shown in FIGS. 14B, 14C has a shape as viewed in plain view where the front side edge portion 17 extends rightward and upward, whereas the rear side edge portion 18 rightward and downward. Especially, the projection 11 shown in FIG. 14C has an isosceles trapezoidal shape.

Figure 15A:
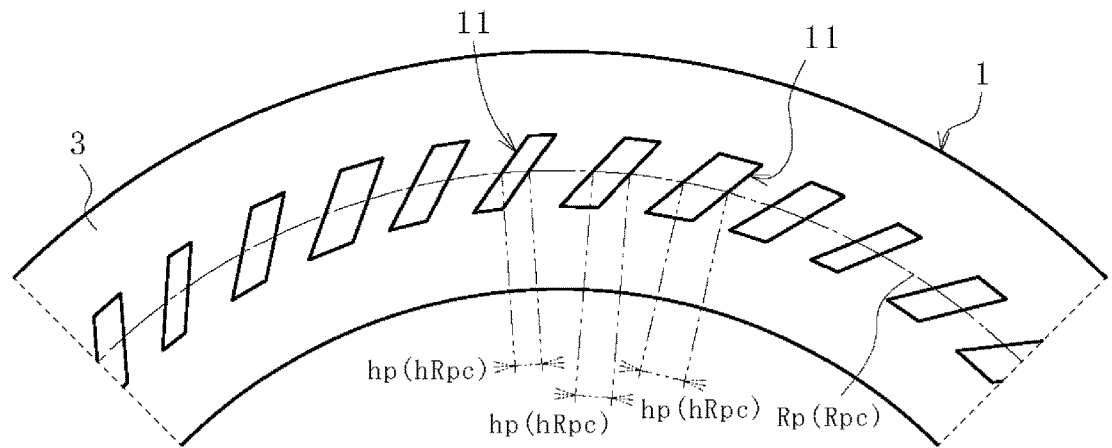
FIG. 15A is a view showing an alternative of arrangement of projections.

In FIG. 15A, two types of the projections 11 with different widths hRp are alternately arranged.

Figure 15B:
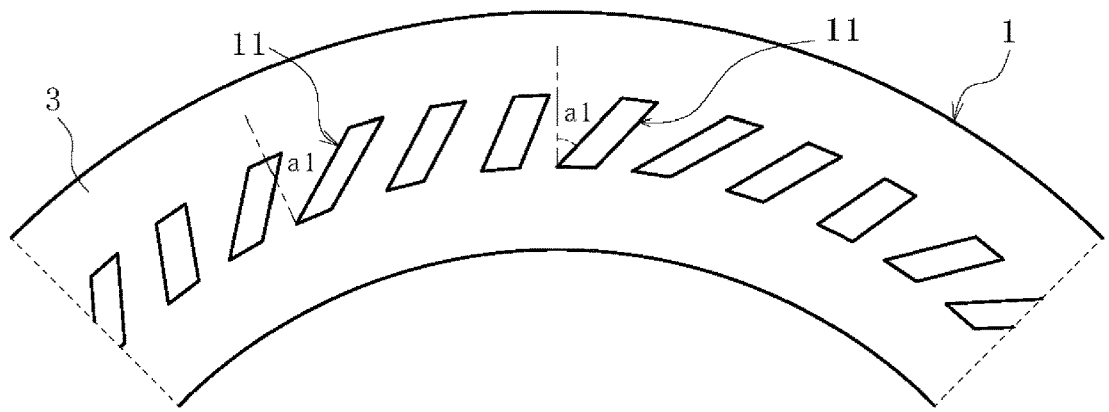
FIG. 15B is a view showing another alternative of arrangement of projections.
Figure 15C:
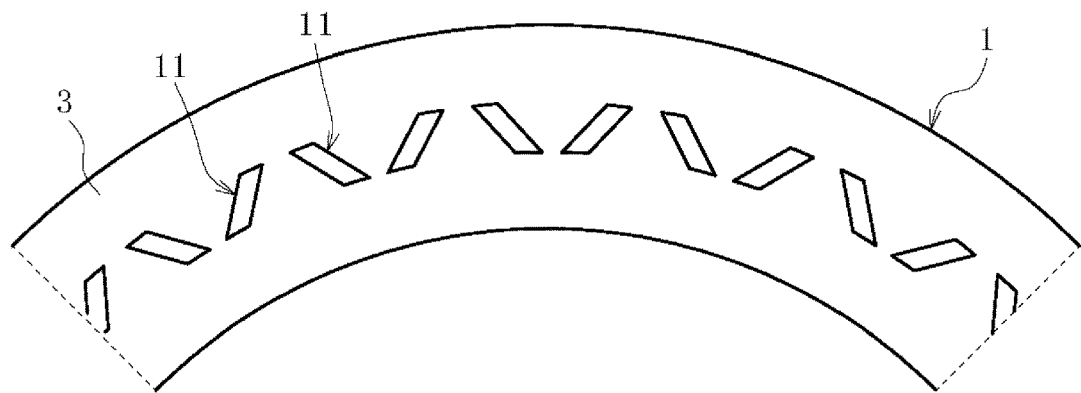
FIG. 15C is a view showing still another alternative of arrangement of projections.

In FIGS. 15B, 15C, two types of the projection 11 with different inclination angles a 1 of the front side edge portion 17 are alternately arranged. In FIG. 15B, both of two kinds of the projections 11 have the front side edge portion 17 extending rightward and upward. In FIG. 15C, one of the two types of the projections 11 has the front side edge portion 17 extending rightward and upward, whereas the other of projections 11 has the front side edge portion 17 extending rightward and downward.

Figure 15D:
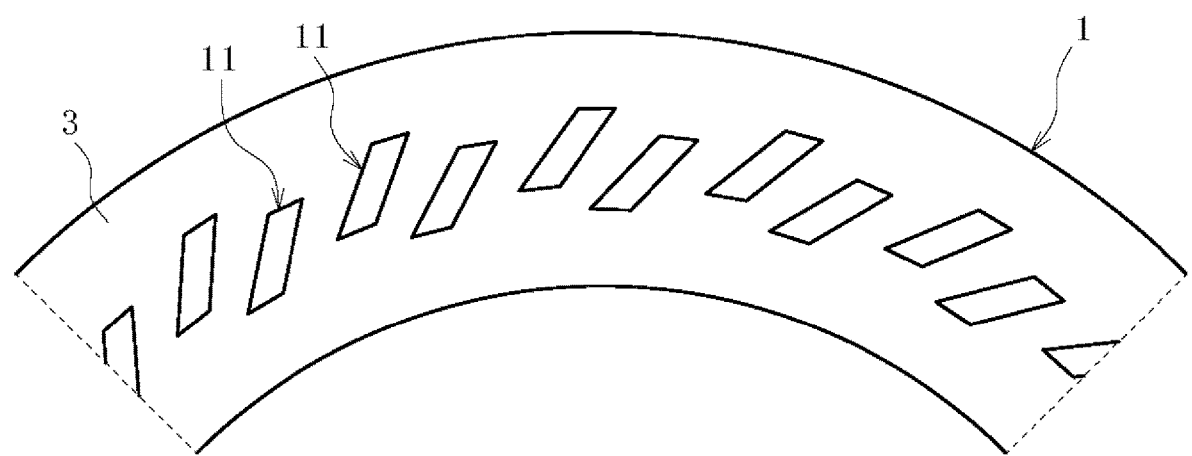
FIG. 15D is a view showing still another alternative of arrangement of projections.

In FIG. 15D, two types of the projections 11 with different positions in the tire radius direction are alternately arranged on a surface of tire side portion 3.

Figure 16A:
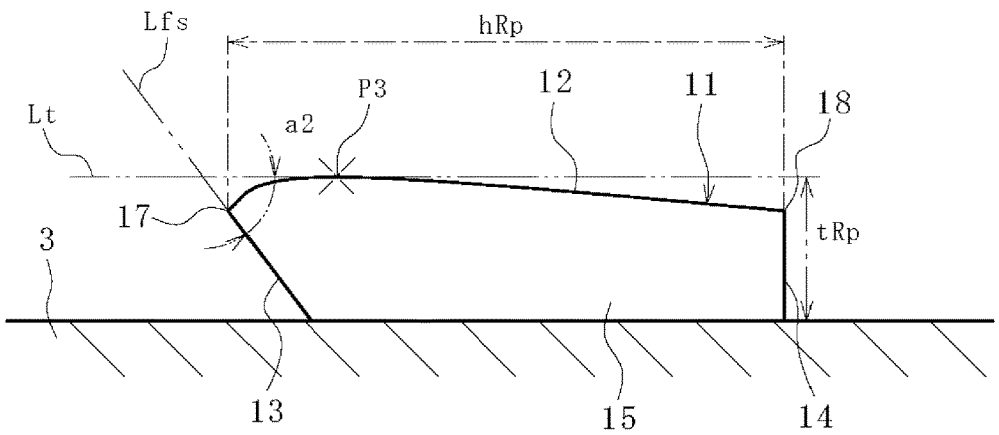
FIG. 16A is a view showing another alternative of the shape of the projection as viewed in the end surface view.
Figure 16B:
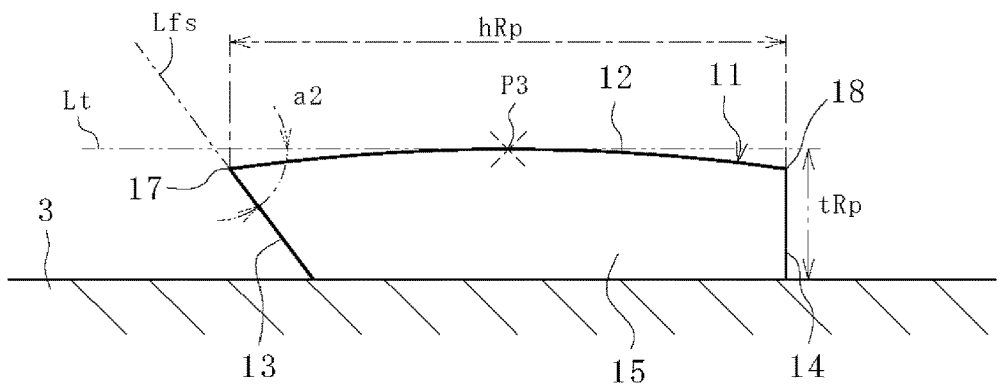
FIG. 16B is a view showing still another alternative of the shape of the projection as viewed in the end surface view.
Figure 16C:
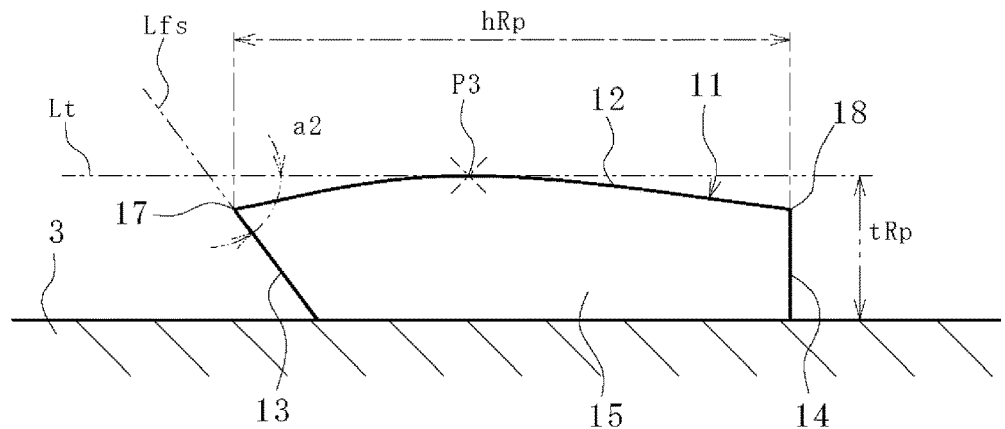
FIG. 16C is a view showing still another alternative of the shape of the projection as viewed in the end surface view.

FIGS. 16A to 16C shows various alternatives of the shape of the top surface 12 of the projection as viewed in a plan view. The projection 11 shown in FIG. 16A has the top surface 12 of a blade sectional shape as viewed in a plan view. The projection 11 shown in FIG. 16B has the top surface 12 of an arcuate shape as viewed in a plan view. The projection 11 shown in FIG. 16C has the top surface 12 of curved shape other than the blade sectional shape or the arcuate shape as viewed in a plan view.

FIGS. 17A to 18B show alternatives of the shapes of the front side surface 13 of the projection as viewed in an end surface view.

The front side surface 13 of the projecting 11 shown in FIGS. 17A to 17D forms one recess 23 as viewed in an end surface view.

Figure 17A:
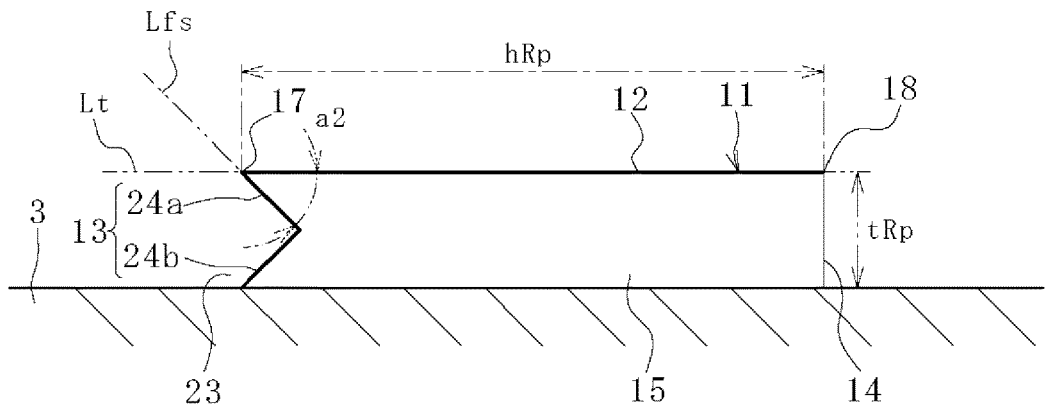
FIG. 17A is a view showing an alternative of the shape of the projections as viewed in the end surface view.

The front side surface 13 of the projection 11 shown in FIG. 17A is formed of two flat surfaces 24a, 24b. As viewed in an end surface view, the flat surface 24a of the left side surface 13 extends rightward and downward, and the flat surface 24b of the right side surface 14 extends rightward and upward. A recess 23 having a triangular shape as viewed in an end surface view is formed of these flat surfaces 24a, 24b.

Figure 17B:
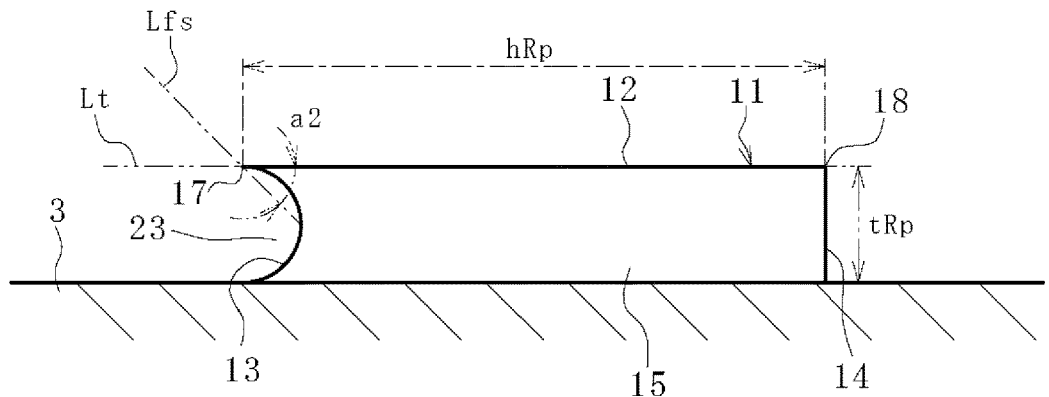
FIG. 17B is a view showing another alternative of the shape of the projections as viewed in the end surface view.

The front side surface 13 of the projection 11 shown in FIG. 17B is formed of a curved surface having a semicircular cross-sectional shape. A recess 23 having a semicircular shape as viewed in an end surface view is formed by such a curved surface.

Figure 17C:
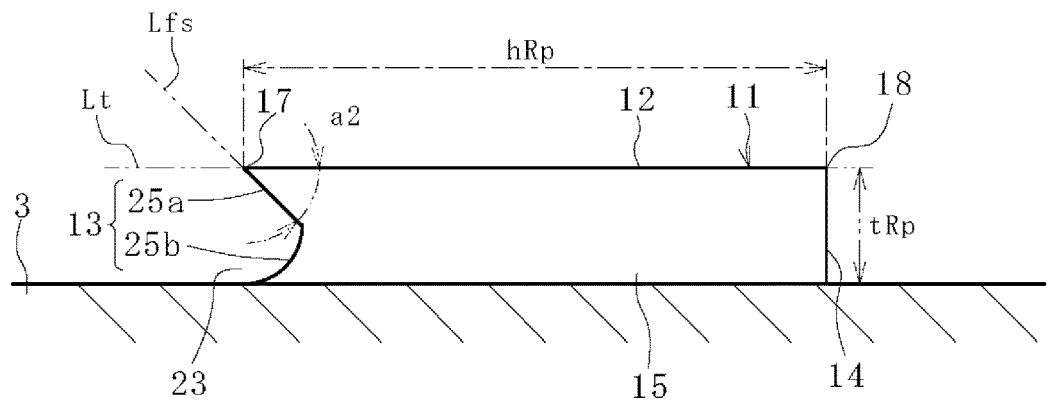
FIG. 17C is a view showing still another alternative of the shape of the projections as viewed in the end surface view.
Figure 17D:
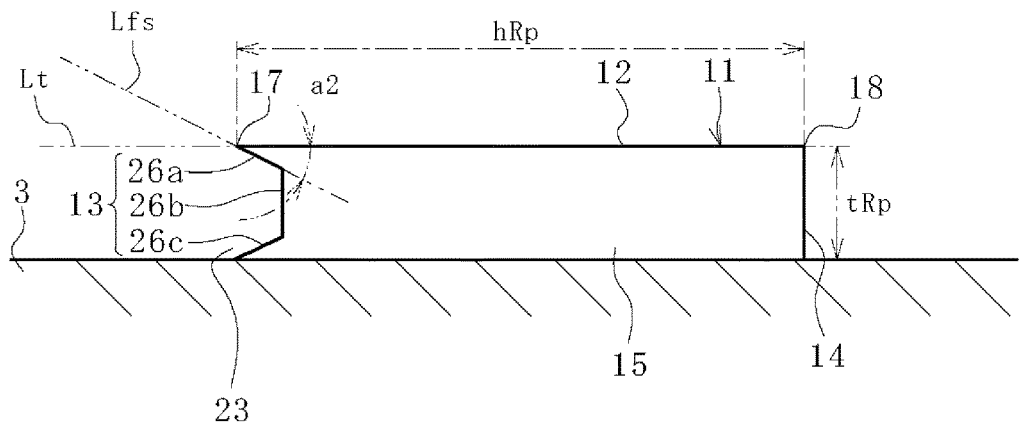
FIG. 17D is a view showing still another alternative of the shape of the projections as viewed in the end surface view.

The left side surface 13 of the projection 11 shown in FIG. 17C is formed of a flat surface 25a extending rightward and downward as viewed in an end surface view, and a curved surface 25b having a circular cross-sectional shape. The flat surface 25a is positioned on a top surface 12 side of the projection 11, and the curved surface 25b is positioned on a surface side of the tire side portion 3. A recesses 23 is formed by the flat surface 25a and the curved surface 25b.

The front side surface 13 of the projection 11 shown in FIG. 16D is formed of three flat surfaces 26a, 26b, and 26c. As viewed in an end surface view, the flat surface 26a of on a top surface 12 side extends rightward and downward, the flat surface 26c on a surface side of the tire side portion 3 extends rightward and upward, and the flat surface 26b at the center of the left side surface 13 extends in a tire radial direction. A polygonal recess 23 is formed by these flat surfaces 26a to 26c.

Figure 18A:
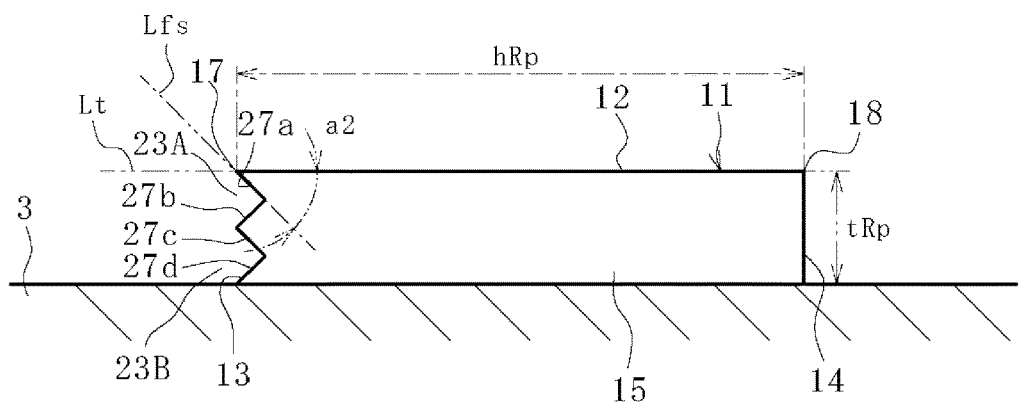
FIG. 18A is a view showing an alternative of the shape of the projections as viewed in the end surface view.
Figure 18B:
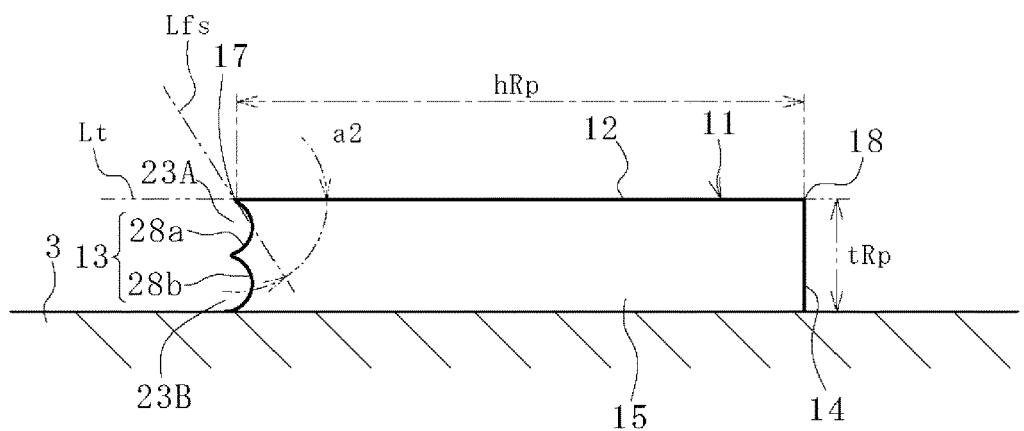
FIG. 18B is a view showing another alternative of the shape of the projections as viewed in the end surface view.

Each of the left side surface 13 and the right side surface 14 of the projection 11 shown in FIGS. 18A and 18B is formed of two recesses 23A, 23B disposed adjacently to each other in a tire radial direction as viewed in an end surface view.

The front side surface 13 of the projection 11 shown in FIG. 18A is formed of four flat surfaces 27a to 27d. As viewed in an end surface view, the flat surface 27a on a top surface 12 side extends rightward and downward, and the flat surface 27b which extends leftward and downward, the flat surface 27c which extends rightward and downward, and the flat surface 27d which extends leftward and downward are sequentially arranged toward a surface of the tire side portion 3. One recess 23A having a triangular cross-sectional shape is formed on the left side surface 13 and the front side surface 13 on a top surface 12 side of the projection 11 by the flat surfaces 27a, 27b, and one recess 23B having substantially the same triangular cross-sectional shape as the recess 23A is formed on the front side surface 13 adjacently to the recess 23A and on a side of a surface of the tire side portion 3 by the flat surfaces 27c, 27d.

The front side surface 13 of the projection 11 shown in FIG. 18B is formed of two curved surfaces 28a, 28b having a semicircular cross-sectional shape respectively. One recess 23A having a semicircular cross-sectional shape is formed on the front side surface 13 by the curved surface 28a, and one recess 23B substantially having the same semicircular cross-sectional shape as the recess 23A is formed on the front side surface 13 by the curved surface 28b adjacently to the recess 23A on a surface side of the tire side portion 3.

The front side surface 13 of the projection 11 may be formed of three or more recesses disposed adjacently to each other in a tire radial direction as viewed in an end surface view.

By properly setting shapes, sizes and the numbers of the recesses formed on the front side surface 13 shown in FIGS. 17A to 18B, it is possible to adjust a flow rate ratio between an air flow AF1 which flows along the top surface 12 of the projection 11 and an air flow AF2 which flows along the front side surface 13 of the projection 11.

One projection 11 may be formed by combining either one of the shapes of the top surface 12 shown in FIGS. 16A to 16C and either one of the shapes of the front side surface 13 shown in FIGS. 17A to 18B.

With reference to FIGS. 5, and 16A to 18B, an angle made by the top surface 12 and the front side surface 13 of the projection 11 on the front side edge portion 17, that is, a tip end angle a2 of the projection 11 is defined as an angle made by a straight line Lt which corresponds to the top surface 12 and a straight line Lfs which corresponds to a portion of the front side surface 13 in the vicinity of the front side edge portion 17 as viewed in an end surface view.

The straight line Lt is defined as a straight line which passes a portion of the top surface 12 having the largest thickness tRp, and extends along a surface of the tire side portion 3. With reference to FIGS. 5, and 17A to 18B, when the top surface 12 is a flat surface extending along a surface of the tire side portion 3, a straight line which is obtained by extending the top surface 12 per se as viewed in an end surface view is the straight line Lt. With reference to FIGS. 16A to 16C, when the top surface 12 is formed of a curved surface, a straight line which passes a position P3 where the top surface 12 has the largest thickness tRp as viewed in an end surface view and extends along a surface of the tire side portion 3 is the straight line Lt.

With reference to FIGS. 5 and 16A to 16C, when the front side surface 13 is formed of a single flat surface, a straight line which is obtained by extending the front surface 13 per se as viewed in an end surface view is the straight line Lfs. With reference to FIGS. 17A to 17D, when the front side surface 13 if formed of a single recess 23, a straight line which connects the front side edge portion 17 and the most recessed portion of the recess 23 as viewed in an end surface view is the straight line Lfs. With reference to FIGS. 18A and 18B, when a plurality of recesses 23A, 23B (in this example, two recesses) is formed on the front side surface 13, a straight line which connects the front side edge portion 17 and the most recessed position of the recess 23A positioned on the most top surface 12 side as viewed in an end surface view is the straight line Lfs.

Second Embodiment

Figure 19:
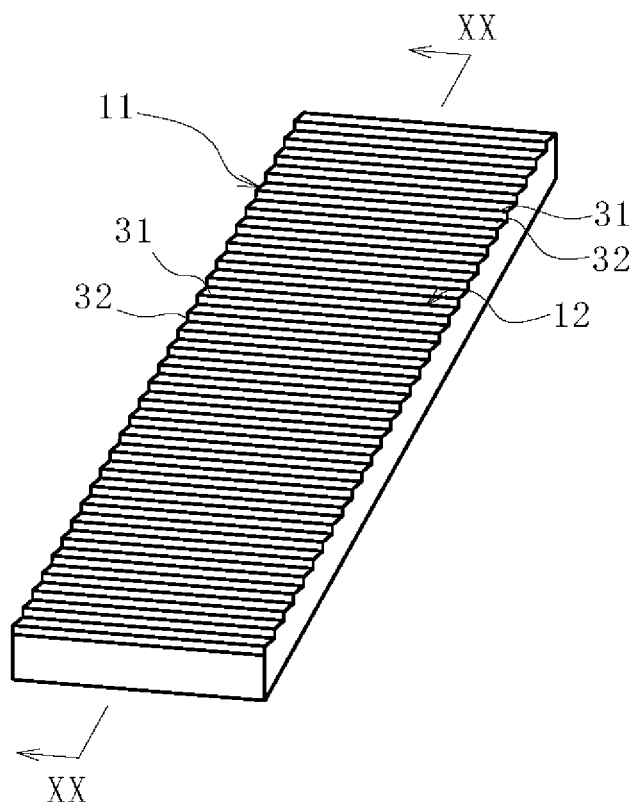
FIG. 19 is a plain view showing a projection according to a second embodiment of the present invention.
Figure 20:
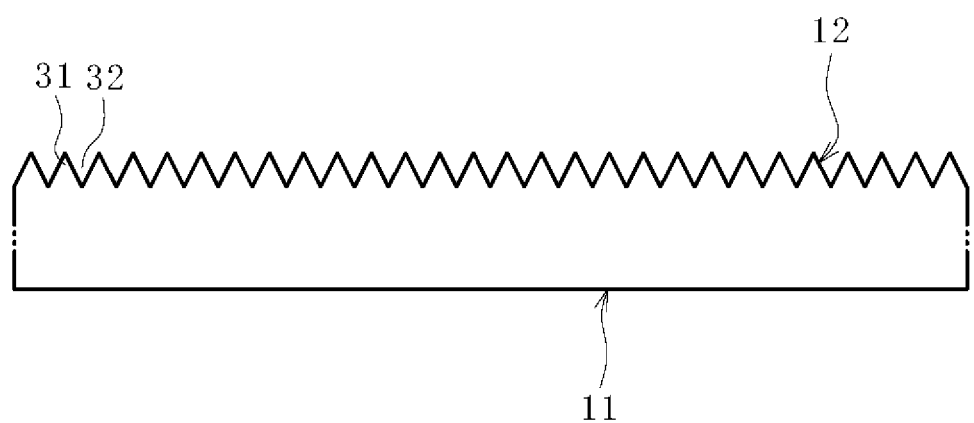
FIG. 20 is a sectional view taken along a line XX-XX in FIG. 19.

FIGS. 19 and 20 show a second embodiment of the present invention. The tire according to this embodiment is similar with that of the first embodiment except that the shape of the projection 11 per se in this embodiment differs from that of the projection 11 in the first embodiment.

In this embodiment, the top surface 12 of the projection is formed with a plurality of ridges 31 each of which has a triangular sectional shape and extends in the tire circumferential direction, and a plurality of grooves 32 each of which defined between the two ridges 31 adjacent to each other, has an inverted triangular shape, and extends in the tire circumferential direction. In other words, the ridge 31 and the groove 32 are alternately and repeatedly arranged on the top surface 12 of the projection 11 in the tire radial direction. Forming the ridges 31 and the grooves 32 in the top surface 12 increases, an area of the top surface 12, that is, a heat radiation area by the laminar flow. As a heat radiation property of the projection 11 is enhanced.

Figure 21A:
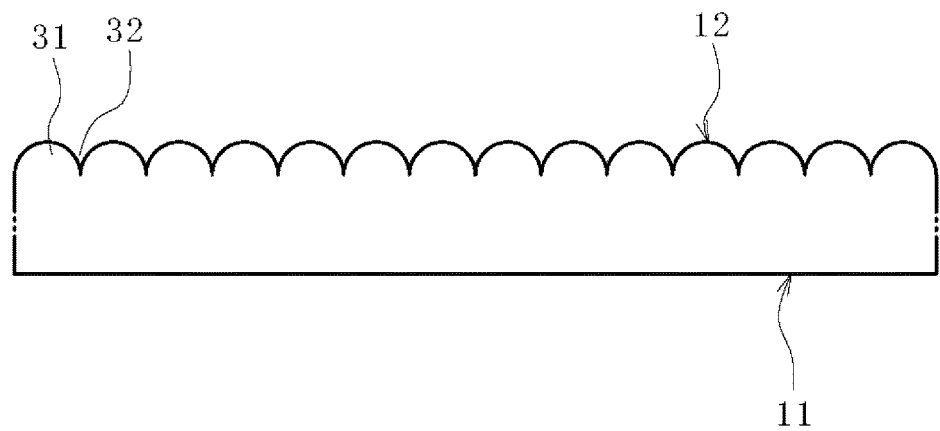
FIG. 21A is a view of sectional configuration of an alternative similar to FIG. 20.
Figure 21B:
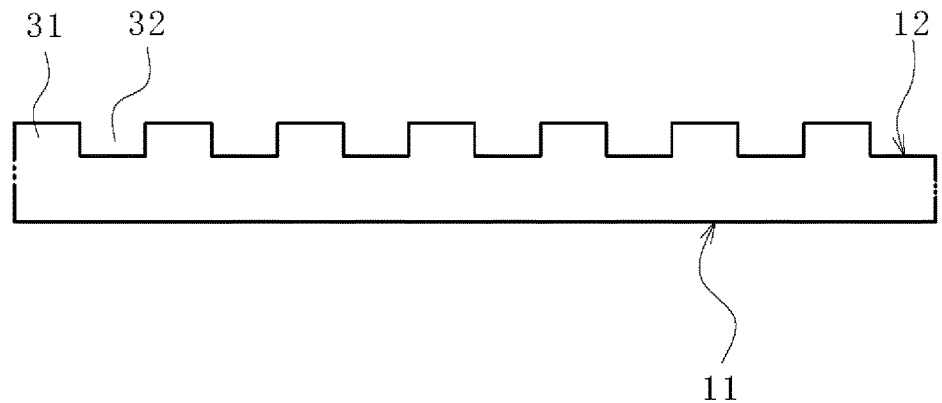
FIG. 21B is a view of sectional configuration of another alternative similar to FIG. 20.

As shown in FIG. 21a, the ridge 31 may have a semicircular cross-sectional shape, and groove 32 has a shape complementary to such shape of the ridge 31. Further, as shown in FIG. 21B, the ridge 31 and the groove 32 have a rectangular cross-sectional shape.

Other Embodiments

Figure 22:
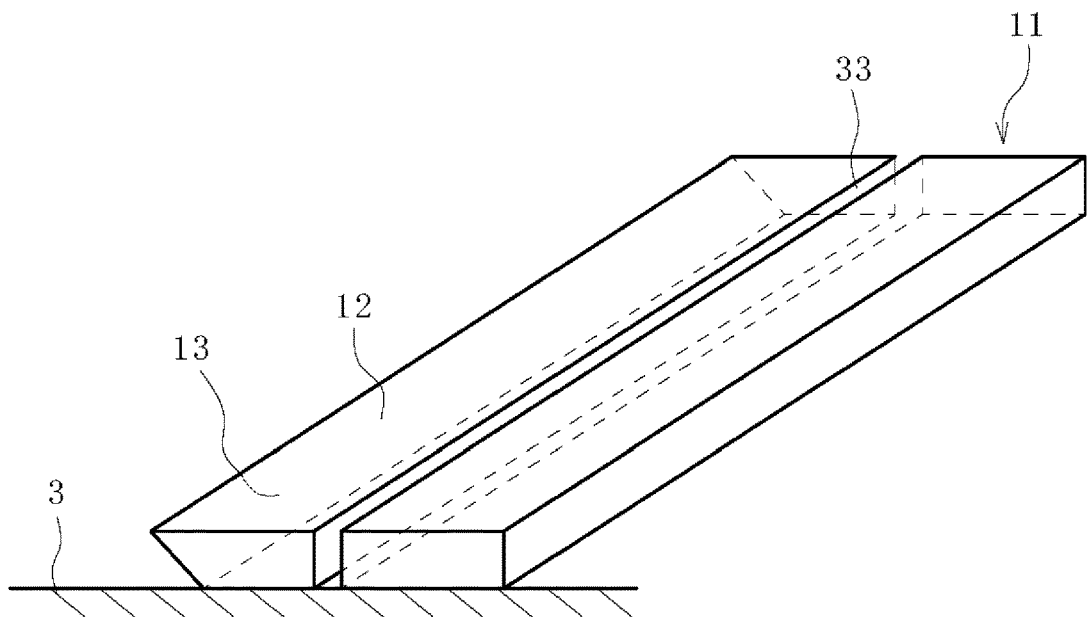
FIG. 22 is a perspective view showing a projection with a longitudinal slit.

With reference FIG. 22, provided that the formation of the laminar flow on the top surface 12 is not outstandingly obstructed, one projection 11 may be divided into two independent portions arranged in the tire circumferential direction by forming one longitudinal slit 33 extending in the tire radius direction. One projection 11 may be divided into three or more independent portions by forming two or more longitudinal slits 33.

Figure 23:
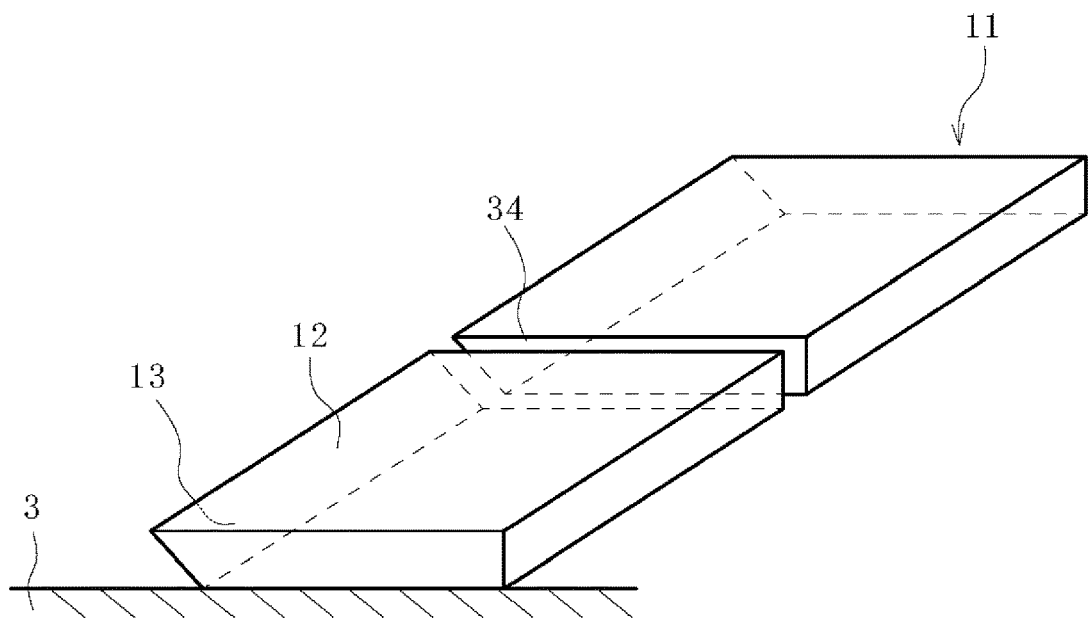
FIG. 23 is a perspective view showing a projection with a lateral slit.

With reference FIG. 23, provided that the formation of the lamination flow on the top surface 12 is not outstandingly obstructed, one projection 11 may be divided into two independent portions arranged in the tire radial direction by forming one lateral slit 34 extending in the tire circumferential direction. One projection 11 may be divided into three or more independent portions by forming two or more lateral slits 34.

One projection 11 may be divided into four or more portions by one or more longitudinal slit 11 and one or more lateral slit 34.

As shown FIGS. 22 and 23, a depth of the longitudinal slit 34 and the lateral slit 34 may be set such that these slits 33 and 34 extend from the tope surface 12 and reach the surface of the tire side portion 3. Alternatively, the depth of these slits 33 and 34 may be set such that these slits 33 and 34 do not reach the surface of the tire side portion 3.

What is claimed is:

1. A pneumatic tire, comprising a projection formed on a surface of a tire side portion, wherein
a thickness of the projection, which is a distance from the surface of the tire side portion to a top surface of the projection is smaller than a width of the projection, which is a size of the top surface in a tire circumferential direction,
the width of the projection satisfies the following:

$$10 \leq hRp \times \left(\frac{Rp}{R}\right) \leq 50$$

R: tire radius
Rp: distance from the center of rotation of tire to arbitrary position on projection
hRp: width of projection at position away from the center of rotation of tire by distance Rp;
a tip end angle which is an angle formed by the top surface and the front side surface at the front side edge portion is equal to or smaller than 90°;
the top surface is a convex surface in a tire rotation direction, with a maximum thickness of the projection being at a peak (P3) of the convex surface at a location in between the front side surface and a rear side surface,
the front side surface is a flat surface, and said maximum thickness of the projection at said peak of the convex surface at said location in between the front side surface and the rear side surface is greater than smaller thicknesses of said projection at front and rear portions of said convex surface that are adjacent to said front side surface and said rear side surface.

2. The pneumatic tire according to claim 1, wherein the tip end angle is equal to or larger than 45° and equal to or smaller than 65°.

3. The pneumatic tire according to claim 1, wherein ridges extending in the tire circumferential direction and grooves extending in the tire circumferential direction are alternatively formed on the top surface of the projection.

4. The pneumatic tire according to claim 1, wherein the top surface has a blade sectional shape.

5. The pneumatic tire according to claim 1, wherein the top surface has an arcuate shape.

6. The pneumatic tire according to claim 1, wherein the projection is configured to divide an air flow AF0 that flows to the projection into a laminar air flow AF1 that continues in the direction of the air flow AF0 but flows across the entire width of said top surface of the projection as a laminar air flow and an angled air flow AF2 that is directed at an angle from said direction of said air flow AF0 along the inclination angle of said front side edge portion.

7. The pneumatic tire according to claim 6, wherein said tire is configured such that said air flow AF1 that flows in a laminar flow across said top surface of said projection falls off from the rear side edge portion of the projections toward and impinges the surface of the tire side portion in a downstream position from the projection and is turned into a turbulent air flow AF3 between said projection and another projection downstream of said projection.

8. A pneumatic tire, comprising a projection formed on a surface of a tire side portion, wherein
a thickness of the projection, which is a distance from the surface of the tire side portion to a top surface of the projection is smaller than a width of the projection, which is a size of the top surface in a tire circumferential direction,
the width of the projection satisfies the following:

$$10 \leq hRp \times \left(\frac{Rp}{R}\right) \leq 50$$

R: tire radius
Rp: distance from the center of rotation of tire to arbitrary position on projection
hRp: width of projection at position away from the center of rotation of tire by distance Rp;
an inclination angle of the front side edge portion of the projection satisfies the following:

$$23° \leq a1 \leq 43° \text{ or } 113° \leq a1 \leq 133°$$

a1: inclination angle;
a tip end angle which is an angle formed by the top surface and the front side surface at the front side edge portion is equal to or smaller than 90°;
the top surface is a convex surface in a tire rotation direction, with a maximum thickness of the projection being at a peak (P3) of the convex surface at a location in between the front side surface and a rear side surface,
the front side surface is a flat surface, and
said maximum thickness of the projection at said peak of the convex surface at said location in between the front side surface and the rear side surface is greater than smaller thicknesses of said projection at front and rear portions of said convex surface that are adjacent to said front side surface and said rear side surface.

9. The pneumatic tire according to claim 8, wherein the tip end angle is equal to or larger than 45° and equal to or smaller than 65°.

10. The pneumatic tire according to claim 8, wherein ridges extending in the tire circumferential direction and grooves extending in the tire circumferential direction are alternatively formed on the top surface of the projection.

11. The pneumatic tire according to claim 8, wherein the top surface has a blade sectional shape.

12. The pneumatic tire according to claim 8, wherein the top surface has an arcuate shape.

13. The pneumatic tire according to claim 8, wherein the projection is configured to divide an air flow AF0 that flows to the projection into a laminar air flow AF1 that continues in the direction of the air flow AF0 but flows across the entire width of said top surface of the projection as a laminar air flow and an angled air flow AF2 that is directed at an angle from said direction of said air flow AF0 along the inclination angle of said front side edge portion.

14. The pneumatic tire according to claim 13, wherein said tire is configured such that said air flow AF1 that flows in a laminar flow across said top surface of said projection falls off from the rear side edge portion of the projections toward and impinges the surface of the tire side portion in a downstream position from the projection and is turned into a turbulent air flow AF3 between said projection and another projection downstream of said projection.

\* \* \* \* \*